Nov. 22, 1938.　　D. W. HOFERER ET AL　　2,137,402
PUMP VALVE CONSTRUCTION
Filed Dec. 21, 1936
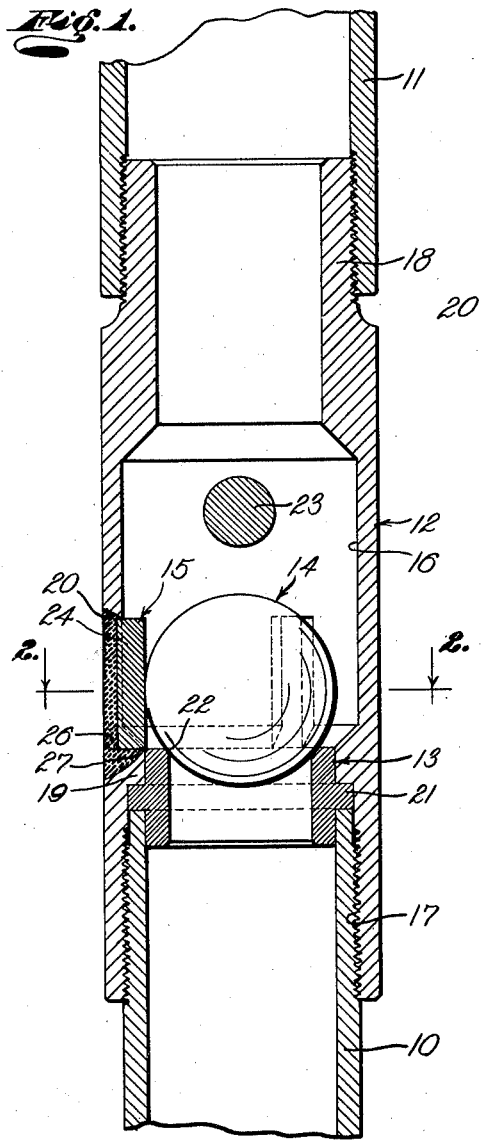
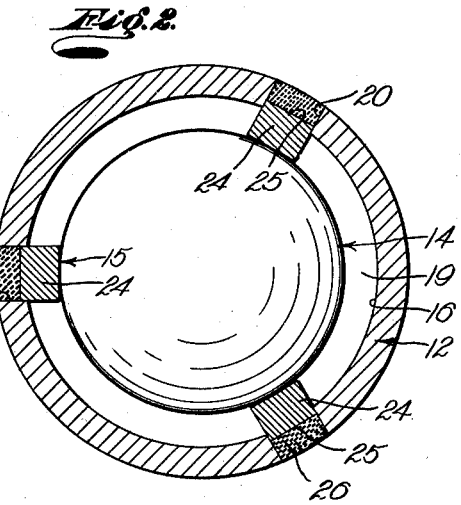
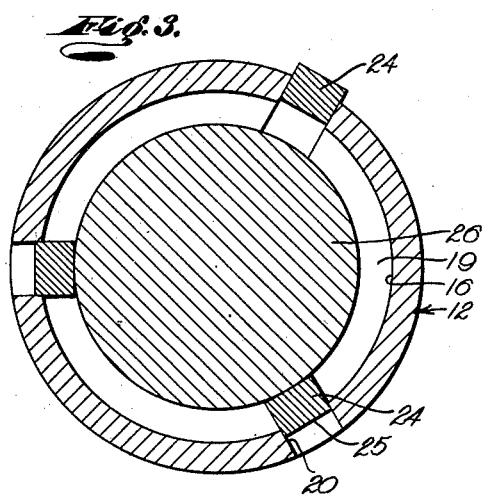
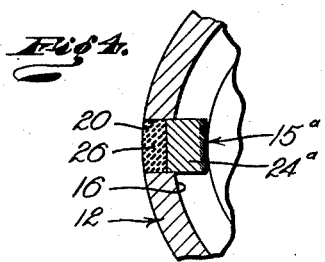
Inventors
Daniel W. Hoferer
and
Edward T. Adams
By
Their Attorney Patented Nov. 22, 1938

2,137,402

UNITED STATES PATENT OFFICE 2,137,402

PUMP VALVE CONSTRUCTION

Daniel W. Hoferer and Edward T. Adams, Long Beach, Calif., assignors to Hofco Pump, Ltd., Long Beach, Calif., a corporation of California Application December 21, 1936, Serial No. 116,953

8 Claims. (Cl. 251—121)

This invention relates to valves and relates more particularly to the valves of deep well pumps. A general object of this invention is to provide a well pump valve embodying an improved, strong, and very durable cage.

Well pumps such as oil well pumps usually embody valves of the ball type. A pump valve of this nature includes a tubular body or cage for containing the ball valve. This cage is usually connected between elements of the pump and, therefore, is subjected to shock and heavy stresses. Because of the very restricted space in which a well pump operates the wall of the valve cage is quite thin and it is highly desirable to form the cage of a material offering a maximum resistance to shock and stress. The flow of fluid through the valve seat and the valve cage is violent and causes rotation and erratic movement of the ball. This movement of the ball results in substantial wear to the parts of the cage engaged by the ball.

Cages for pump valves have been introduced having internal ribs of bronze and of the same material as the cages for dampening the whirling motion of the fluid, for guiding the ball and for protecting the cage proper against wear. In order to provide these ribs on the interior of the cage it was found necessary to part the cage horizontally into two sections and then provide the ribs on the lower section so that they extended upwardly into the upper section when the two sections were assembled. The two sections of a valve cage of the character referred to were welded together. The construction just mentioned is very expensive and the ribs on the interior of the cage are of necessity of a material having a low resistance to wear and abrasion and are not strongly secured to the cage so that they are liable to fall into the pump.

Another object of this invention is to provide a well pump valve embodying a cage of strong, tough material capable of dependably withstanding the stresses to which it may be subjected and guide ribs on the interior of the cage of a hard material having a high resistance to wear and abrasion for guiding the ball, protecting the cage against wear, and for dampening the whirling motion of the fluid.

Another object of this invention is to provide a valve of the character mentioned in which the cage is an integral or one-piece member formed of an exceptionally tough material resistant to shock and stress.

Another object of this invention is to provide a pump valve of the character mentioned in which the hard ball guiding ribs or hard surfaced ribs are joined or secured to the one piece cage in such a manner that they cannot break or become displaced from the cage.

Another object of this invention is to provide an improved pump valve of the character mentioned in which the guiding ribs are the inner projecting portions of very hard inserts welded in slots in the wall of the tubular valve cage.

Another object of this invention is to provide a pump valve of the character mentioned in which the materials of the cage and the hard ball guiding ribs are such that they are readily joined or bonded by strong solid bonds of welding.

Another object of this invention is to provide a pump valve of the character mentioned in which the hard inserts forming the ball guiding ribs readily harden after the welding process either by air hardening or by moderate temperature heat treatment and the cage body is substantially unaffected by the welding process.

A further object of this invention is to provide an improved pump valve cage that is simple and inexpensive to manufacture.

The various objects and features of our invention will be fully understood from the following detailed description of typical preferred forms and applications of the invention, throughout which description reference is made to the accompanying drawing, in which:

Fig. 1 is a longitudinal detailed sectional view of a well pump valve embodying the present invention. Fig. 2 is an enlarged transverse detailed sectional view taken as indicated by line 2—2 on Fig. 1. Fig. 3 is a view similar to Fig. 2 illustrating the manner in which the inserts or blocks are positioned in the slots of the cage, and Fig. 4 is a fragmentary vertical detailed sectional view illustrating a modified form of guide.

The valve structure of the present invention is adapted to be embodied in valves for use in various classes of well pumps and in valves for application to various well pump elements. In the drawing we have illustrated a typical valve of the invention connected between two tubular well pump elements 10 and 11 that may be considered elements of a pump barrel, elements of a pump plunger, or other well pump parts. It is to be understood that the invention is not to be construed as limited or restricted to the specific form of application of the invention illustrated in the drawing and about to be described.

The improved pump valve provided by this invention includes a tubular cage body 12 interposed between the pump elements 10 and 11, or connected to one pump element, for example, the element 10, a seat 13 in the cage body 12, a ball 14 in the body 12 for cooperating with the seat 13 and ribs 15 on the interior of the cage body 12 for guiding the ball 14 and for dampening the whirling motion of the fluid passing through the body.

The cage body 12 is a tubular structure or member for containing the ball 14 and for handling or conducting the pumped fluid. In the particular form of the invention the body 12 has a central longitudinal opening 16 extending through it from one end to the other. It is a feature of the invention that the cage body 12 is an integral or one-piece member. The body 12 is elongate and cylindrical in configuration and in the application of the invention illustrated has means at its opposite ends for connecting with the pump elements 10 and 11, it being understood that the body may be connected to only one pump element in some installations. An internal thread 17 is provided in the lower end portion of the cage body 12 and the upper portion of the pump element 10 is threaded into the body. The upper portion of the cage body 12 is reduced in diameter to constitute a pin 18 which may be threaded into the lower portion of the pump element 11. An internal annular flange 19 is provided on the cage body 12 above the thread 17. The lower side of the flange 19 may be flat and normal to the longitudinal axis of the body 10 while the upper side of the flange may be inclined downwardly and inwardly relative to said axis. The internal diameter of the cage body 12 is increased above the flange 19 to provide a substantial fluid passing space around the ball 14 when the ball is raised from the seat 13. This enlarging of the internal diameter of the intermediate portion of the cage body 12 of course reduces its wall thickness. The internal diameter of the upper portion or pin 18 of the body 12 may be reduced.

In accordance with the invention a plurality of circumferentially spaced openings or slots 20 is provided in the wall of the body 12. The slots 20 extend upwardly from a plane at or adjacent the flange 19 and terminate a considerable distance below the pin 18 so that they are confined to the portion of the body which encloses or surrounds the ball 14. The slots 20 may have flat parallel side walls and may be readily milled in the body 12. In practice there may be three or more equally spaced slots 20 of the same size and shape. It is important that the cage body 12 be formed of a tough, strong material capable of dependably withstanding shock and stress. In practice the body 12 is formed of a low carbon steel having a toughening and strengthening alloy content. It is to be noted that the body 12 is simple and inexpensive and particularly strong and shock resisting.

The seat 13 is adapted to be engaged by the ball 14 during certain phases of operation of the pump to close off the passage or opening 16 through the cage body 12. In accordance with the broader aspects of the invention any suitable form of valve seat may be employed. In the drawing we have illustrated a replaceable seat 13 arranged in the body 12 to extend upwardly through the flange 19 and to project downwardly into the upper portion of the pump element 10. The seat 13 is provided with an annular flange 21 which is clamped between the lower side of the body flange 19 and the upper end of the pump element 10. The upper end of the seat 13 is provided with a suitable surface 22 to be engaged or sealed against by the ball 14.

The ball 14 may be a simple spherical member of steel arranged in the cage body 12 to seat downwardly against the surface 22 of the seat 13. The ball 14 is proportioned to have substantial clearance with the wall of the body opening 16 when in engagement with the seat 13 and when properly aligned with the seat. When the ball 14 is raised from its seat 13 there is ample clearance or space around it for the flow of fluid as will be readily understood from the drawing. Suitable means is provided for limiting the upward travel of the ball 14. In the case illustrated this means comprises a pin 23 carried by the cage body 12 and extending transversely across its opening 16 at a suitable point above the seat 13.

The ribs 15 are provided to guide the ball 14, to dampen the swirling motion of the fluid passing through the cage body 12 and to protect the wall of the body against wear. The ribs 15 and their mode of attachment to the body 12 are features of the invention. The ribs 15 project inwardly from the wall of the body opening 16 and are the inner portions of inserts or blocks 24 arranged in the above described slots 20. The blocks 24 are simple elongate members proportioned and shaped to properly fit in the slots 20. In the structure illustrated the blocks 24 which provide the ribs 15 are elongate parts of square or rectangular cross section. The blocks 24 are proportioned to project inwardly from the wall of the body opening 16 a sufficient distance to have guiding cooperation with the ball 14 when their outer surfaces 25 are somewhat inset from the periphery of the body 12. This relationship is clearly illustrated in the drawing.

To assure the proper positioning of the blocks 24 a mandrel 26 may be arranged centrally through the body 12 and the blocks 24 may be inserted or driven into the slots 20 to be stopped or positioned by the mandrel 26. Fig. 3 of the drawing illustrates two of the blocks 24 as set or positioned by engaging against the centering mandrel 26 and illustrates the third block approaching its proper position. In accordance with the invention the blocks 24 which provide the ribs 15 are formed of hard abrasion and wear resisting material. In practice the blocks 24 may be formed of a high carbon tool steel although the blocks may be formed of a high carbon alloy steel or any hard material or hard surfaced material capable of being properly welded in place. In Fig. 4 we have illustrated a block 24ª which may be formed of mild steel, or the like, having a hardened inner surface or an inner surface faced with a hard facing material such as Stellite, or the like. The block 24ª may be welded in its slot 20 in the same manner as the blocks 24.

The hard wear resistant blocks 24 are integrally bonded or welded to the body 12. When the blocks 24 have been properly positioned in the slots 20 as described above, they are directly welded in the slots to be rigidly and permanently secured to the body 12. As pointed out above, the outer sides 25 of the blocks 24 are inset from the periphery of the body 12. This leaves the outer portions of the slots 20 open to receive welding 26. The welding 26 may completely occupy the outer or open portions of the slots 20 to constitute extensive and solid bonds of welding. The welding 26 may also occupy any spaces 27 that may occur in the slots 20 at the ends of the blocks 24. It is preferred to employ nickel steel welding rods and the acetylene welding process in welding the blocks 24 to the body 12, which body preferably contains a strengthening and toughening element such as nickel. During the welding operation suitable precautions should be taken against the inclusion of slag in the weld. The above mentioned method of welding the blocks 24 in the slots 20 results in solid welded bonds between the blocks 24 and the wall of the body 12. The welding 26 at or adjacent the periphery of the body 12 dependably bonds the blocks 24 to the body 12. The cage body 12 is formed of an especially tough material which does not harden locally or set up strains during the welding process. The inserts or blocks 24 being formed of a high carbon steel may air harden after the welding process or, if desired, may be hardened by a moderate normalizing heat treatment immediately following the welding operation.

The above described method of securing or bonding the blocks 24 to the body 12 provides the tough, strong cage body 12 with the very hard blocks 24 or the hard surfaced blocks 24ª dependably secured to the body by solid welded bonds. These blocks 24 or 24ª thus secured to the body 12 project from the internal wall of the body to constitute the wear resistant guides or ribs 15. Following the welding of the blocks 24 to the body 12 and the hardening of the blocks the periphery of the body 12 may be finished or turned to present a smooth regular surface. In this manner any irregularities resulting from the welding operations are removed.

It is believed that the utility of the pump valve provided by the invention will be readily understood from the foregoing detailed description. The guides or ribs 15 guide and center the ball 14 to properly cooperate with its seat 13. When there is a flow of fluid through the cage 12 the ball 14 is raised from the seat and the motion of fluid may cause turning of the ball and erratic movement of the ball. The hard or hard faced guide ribs 15 of course prevent the ball 14 from directly contacting the wall of the cage body 12 and thus protect the body against wear due to movement of the ball. The ribs 15 also operate to retard or dampen undesirable swirling motion of the fluid passing through the cage. The provision of the guides or ribs 15 does not materially reduce the fluid capacity of the cage 12. The guides or ribs 15 present very hard surfaces that effectively resist wear and abrasion and, therefore, are very long wearing. The guides or ribs 15 prevent the ball 14 from contacting the wall of the body 12 and thus prevent wear of the body so that the body has a long life and is not weakened by operation of the ball valve.

The cage body 12 is an integral or one-piece member formed of a tough strong material and, therefore, is not liable to break or fail during operation of the pump. The provision of the slots 20 in the wall of the body 12 does not appreciably weaken the body and when the blocks 24 are welded to the slots, as described above, the body regains its original strength. Accordingly, there is no danger of the body 12 failing or breaking during operation of the pump and the pump element 10 may be properly tightened in the lower portion of the body without danger of spreading or bursting the body wall. Accordingly, the pump element 10 may be tightly set up in the body to clamp the seat 13 in place without danger of breaking the body. The present invention provides an improved valve cage construction for pump valves that is very inexpensive and that is very strong and durable.

Having described only typical preferred forms and applications of our invention, we do not wish to be limited or restricted to the specific details herein set forth, but wish to reserve to ourselves any variations or modifications that may appear to those skilled in the art or fall within the scope of the following claims.

Having described our invention, we claim:

1. A cage for a pump valve including, a body having an opening in its wall, an insert of material harder than the body partially received in the inner portion of the opening and projecting from the inner wall of the body to guide the valve, and welded metal in the remaining portion of the opening fixing the insert to the body and strengthening the body wall.

2. A cage for a well pump valve including, a tubular body having circumferentially spaced openings extending through its wall, members harder than the body received in the inner portions of the openings and projecting into the body to guide a valve therein, and welds occupying the outer portions of the openings securing the members to the body and strengthening the body wall.

3. A cage for a well pump valve including, a one-piece tubular body for housing the valve, the body having circumferentially spaced openings in its wall, members harder than the body partially received in the openings and projecting from the inner wall of the body to guide the valve, and welds in the openings securing the members to the body.

4. A cage for a well pump valve including, a tubular body for housing the valve, the body having circumferentially spaced longitudinal slots through its wall, elongated inserts harder than the body and carried in the inner portions of the slots to project from the inner wall of the body to guide the valve, and welding occupying the remaining portions of the slots securing the inserts to the body and strengthening the body wall.

5. A cage for a well pump valve including, a one piece tubular body for housing the valve, the body having circumferentially spaced openings through its wall, wear resistant inserts in the openings projecting from the internal surface of the body to guide the valve and having their outer sides inset from the periphery of the body, and welding in the outer portions of the openings bonding the inserts to the body.

6. A cage for a well pump valve including, a one piece tubular body of tough, strong material for containing the valve, the body having circumferentially spaced slots through its wall, hard wear resisting blocks in the slots projecting from the internal surface of the body to guide the valve, and bonds of welding in the outer portions of the slots securing the blocks to the body.

7. A valve for a well pump including a tubular cage, means on at least one end of the cage for connection with an element of the pump, a seat in the cage, a valve in the cage for cooperating with the seat, the wall of the body above the seat having circumferentially spaced openings, wear resistant inserts of harder material than the body held in the openings and projecting into the cage to guide the valve, and bonds of welding exposed at the exterior of the cage securing the inserts in the openings by being bonded to both the cage and the insert.

8. A cage for a well pump valve including, a tubular body having circumferentially spaced elongated openings through its wall, valve-guiding blocks of material harder than the body held in the openings and projecting into the body to guide a valve therein, and bonds of welding joined to both the body and a block and exposed at the exterior of the body.

EDWARD T. ADAMS.
DANIEL W. HOFERER.